Figure 1:
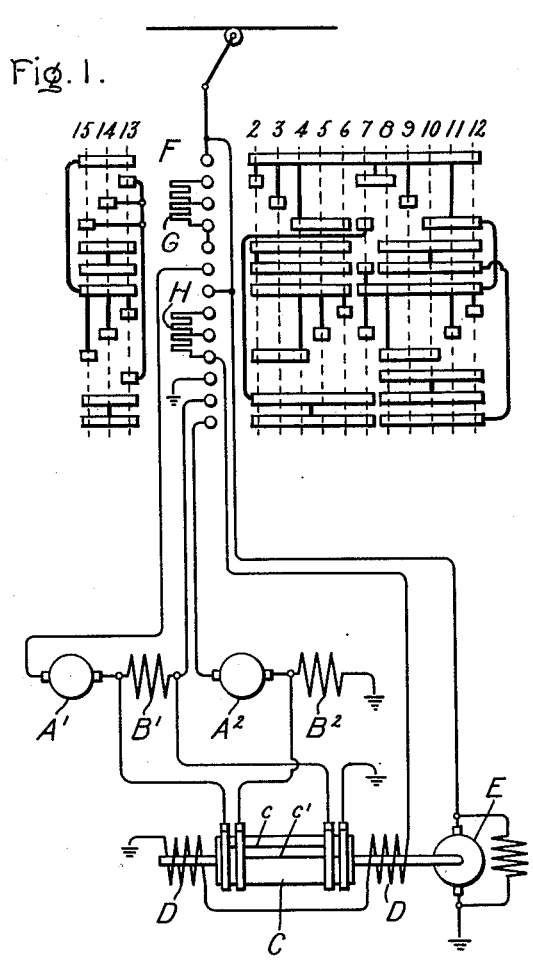

E. F. W. ALEXANDERSON.
MOTOR CONTROL SYSTEM.
APPLICATION FILED SEPT. 11, 1907.

940,112.

Patented Nov. 16, 1909.
3 SHEETS—SHEET 1.

Witnesses:
George H. Tilden
J. Ellis Glen

Inventor:
Ernst F. W. Alexanderson,
by Albert G. Davis
Att'y.

E. F. W. ALEXANDERSON.
MOTOR CONTROL SYSTEM.
APPLICATION FILED SEPT. 11, 1907.

940,112.

Patented Nov. 16, 1909.

3 SHEETS—SHEET 2.

Witnesses:
George H. Tilden
J. Ellis Glen

Inventor:
Ernst F. W. Alexanderson,
by Albert G. Davis
Att'y.

E. F. W. ALEXANDERSON.
MOTOR CONTROL SYSTEM.
APPLICATION FILED SEPT. 11, 1907.

940,112.

Patented Nov. 16, 1909.
3 SHEETS—SHEET 3.

Witnesses:
George W. Tilden
J. Ellis Glew.

Inventor:
Ernst F. W. Alexanderson,
by Albert G. Davis
Att'y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MOTOR-CONTROL SYSTEM.

940,112.   Specification of Letters Patent.   Patented Nov. 16, 1909.

Application filed September 11, 1907. Serial No. 392,253.

*To all whom it may concern:*

Be it known that I, ERNST F. W. ALEXANDERSON, a citizen of the United States, residing at Schenectady, county of Schenectady, State of New York, have invented certain new and useful Improvements in Motor-Control Systems, of which the following is a specification.

My invention relates to the control of series motors, and its object is to provide a novel and efficient method of operating such motors, so as to cause them to return energy to the line for braking.

Series motors are almost universally used for electric traction, since their speed-torque characteristic is excellently adapted for this purpose. The single disadvantage of the series motor, as compared with the shunt or separately-excited motors, is the difficulty that has been experienced heretofore in operating them as braking generators. While various methods of solving this problem have been proposed heretofore, they have involved such complication, or such a departure from the speed-torque characteristic of a simple series motor that they have not found general application. By my invention regenerative braking is obtained in as simple and efficient a manner with series motors, as would be possible with shunt or separately excited motors.

My invention consists in connecting the armature and field of the motor in series in the usual manner, impressing independent voltages on the field terminals of the several motors independently of the motor speed and of the voltage impressed on the motor terminals and varying simultaneously the amount of said impressed voltages.

More specifically stated, my invention consists in impressing on the field terminals of the several motors independent variable voltages, so that by varying the amount of these voltages simultaneously the motors may be caused to act alternately as motors to drive the load and as generators to return energy to the line. The effect of the voltage impressed on the field terminals is to fix a definite speed below which the motors tend to run as motors, and above which the motors tend to act as generators. But both above and below this speed the motors possess the speed-torque characteristics of a series machine.

My invention further comprises a novel arrangement of apparatus for facilitating the practice of the method above described. For furnishing the voltage to be impressed on the field terminals, I provide a small generator with means for varying its field-strength to vary the amount of the voltage impressed on the field terminals of the motor. In the case of a plurality of motors, which are to be connected in series and in parallel, it is frequently desirable that separate sources of voltage be provided for the different motor fields. I, accordingly, arrange the generator for supplying these voltages as a unipolar machine with a plurality of armature conductors and a plurality of sets of collector rings. By connecting one set of collector rings to one motor field, and the other set to the other motor field, the two field circuits are made independent of each other, so that the motors may be connected in series or in parallel, without disturbing the connections from the motor fields to the generator. Since the voltage required at the field terminals is low, a unipolar generator is well adapted for providing this voltage. Since the motor field is always in series with the armature, and the generator connected across its terminals serves merely to send additional current through the motor field, or to divert a portion of the armature-current therefrom, according as the voltage at the generator terminals is varied, the generator need be large enough to supply only a portion of the current required in the motor fields.

My invention will best be understood by reference to the accompanying drawings, in which—

Figure 1 shows diagrammatically a pair of motors arranged to be controlled in accordance with my invention; and Figs. 2 to 15, inclusive, are diagrams of the connections established by the controlling switch in Fig. 1, in its different positions.

In the drawings, $A^1$, $A^2$, and $B^1$, $B^2$, represent the armature and fields, respectively, of a pair of series motors.

C represents the armature and D the field of a small unipolar generator. The armature is provided with a plurality of armature conductors indicated by the two conductors $c$ and $c^1$, each of which is provided at its opposite end with collector rings. The collector rings to which the conductor $c$ is connected are connected to the terminals of field winding $B^1$, while the collector rings to which conductor $c^1$ is connected are connected to the terminals of field winding $B^2$. The small unipolar generator is driven mechanically from any suitable source, as, for instance, by a small shunt motor E.

F represents the controlling switch for the motors, and G and H represent the resistances. The connections established by the controlling switch F, in its several positions, are shown in Figs. 2 to 15, the several positions of the controlling switch corresponding to these figures being indicated by dotted lines numbered like the figures. The usual reversing switch for the motors is omitted from Fig. 1, for the sake of simplicity.

Figure 2:
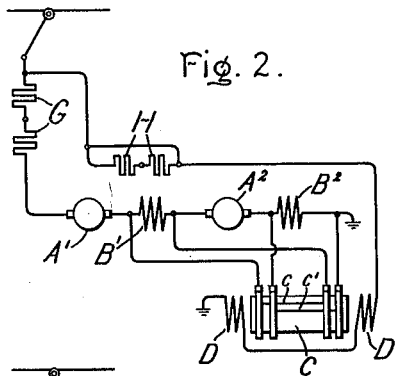
Figure 3:
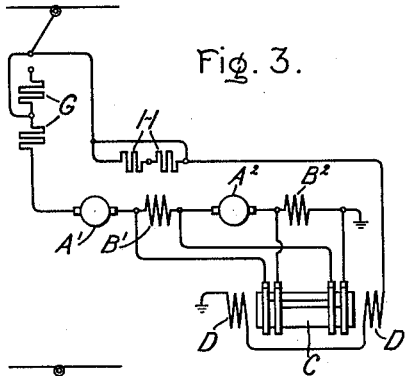
Figure 4:
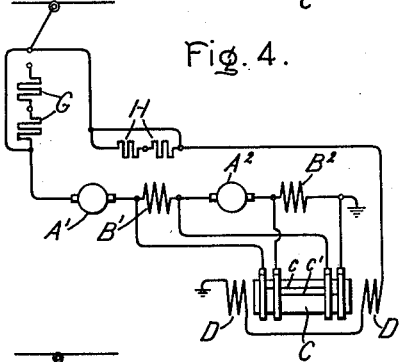
Figure 5:
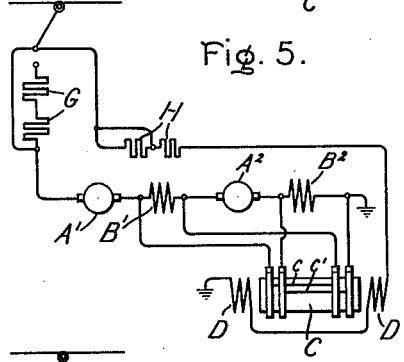
Figure 6:
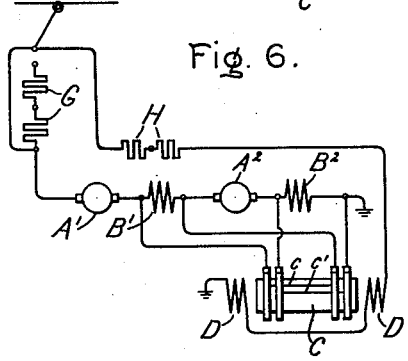
Figure 7:
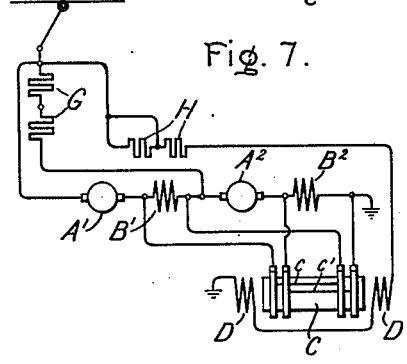
Figure 8:
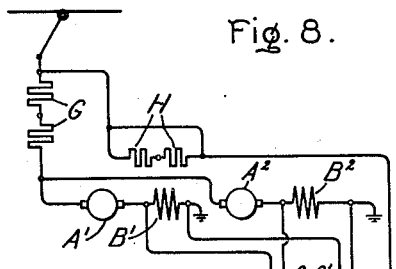
Figure 9:
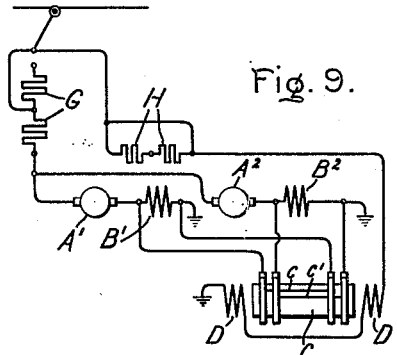
Figure 10:
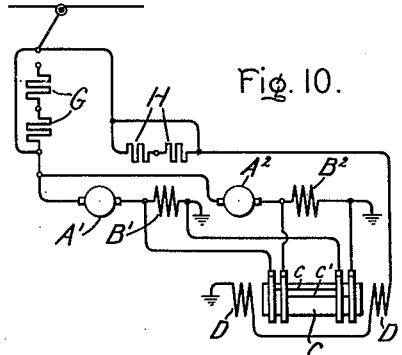
Figure 11:
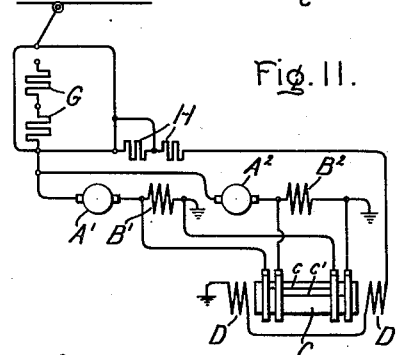

As switch F is moved to its first running position, indicated by dotted line 2, the circuit connections shown in Fig. 2 are established. In this figure, the two motors are connected in series with each other, and with resistance G, as in the ordinary series-parallel rheostatic control. The field D of the small unipolar generator is connected directly across the line, and consequently is at its maximum strength, so that the voltage impressed by the generator on the field terminals of the motors is at a maximum. This voltage increases the current-flow in the motor fields, and so gives a maximum field-strength to the motors at starting. In moving to its second position, switch F establishes the connections of Fig. 3, in which a portion of resistance G is cut out of circuit, while in its third position, as shown in Fig. 4, all of the resistance G is cut out. In moving to the next position, a portion of resistance H is cut into circuit with the field D of the small generator, thereby reducing the armature voltage of the unipolar generator, and consequently weakening the field-strength of the motors. The speed of the motors is thereby further increased. As shown in Fig. 6, the rest of resistance H is next cut into circuit, thereby further weakening the motor fields. The unipolar generator and the resistance H may be so proportioned that whereas with the connections of Fig. 4, the unipolar generator is supplying current to the motor fields in addition to the normal current, in Fig. 6 a portion of the armature current of the motors may be diverted from the motor fields and flow through the armature of the unipolar generator. In other words, the voltage of the unipolar generator may be raised above and reduced below the normal ohmic drop across the terminals of the motor fields. The unipolar generator need then be large enough to supply only the difference between the armature current of the motors and their minimum or maximum field currents. Fig. 6 shows what may be termed the full series position,—that is, the highest speed-position with the two motors in series. Fig. 7 shows the transition connections in which one motor is shunted by the resistance G; a portion of resistance H being simultaneously cut out of circuit. Fig. 8 shows the first parallel position in which the motors are in parallel with each other, and in series with resistance G; the field D of the unipolar generator, and consequently the motor fields being at maximum strength. In passing to positions corresponding to Figs. 9 and 10, switch F cuts out resistance G in two steps, then in passing to the positions corresponding to Figs. 11 and 12, it cuts resistance H into circuit with field winding D thereby again weakening the field of the unipolar generator, and consequently weakening the motor fields and increasing their speed.

While the unipolar generator is provided principally for braking purposes, as will be hereinafter explained, its use results in a saving current at starting and during acceleration, as will be seen by comparing the steps above described with those usually employed with series-parallel control. It will be seen that the amount of resistance in the main circuit is reduced by the present system, and consequently the amount of power wasted in resistance is reduced. Furthermore, a nearer approach to a straight-line current characteristic may be obtained by my method, on account of the means it offers for varying the field-strength of the motors, independently of the motor speed and terminal voltage, so that a very strong field is obtained at starting.

Figure 12:
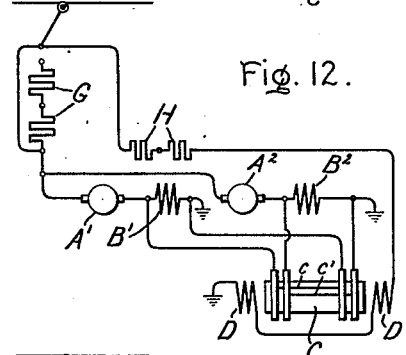

If, after the motors have been brought up to their highest speed, and are operating with the connections shown in Fig. 12, it is desired to brake the car, this result may be accomplished by shifting the controller backward one or two notches. This increases the field-strength and armature-voltage of the unipolar generator, and since this voltage determines the field-current and consequently the counter-electromotive force of the motors for a given speed, a sudden increase in the field-strength of the unipolar generator increases the counter-electromotive forces of the motors above the line-voltage, so as to cause the motors to act as generators to return energy to the line. As the motor speed decreases, the movement of controller F may be continued back toward its off-position, so as to maintain a counter electromotive force above the line-voltage, and thereby to return energy continuously to the line. The rate at which this energy is returned evidently depends upon the rate at which the controller is moved back toward off-position.

Figure 13:
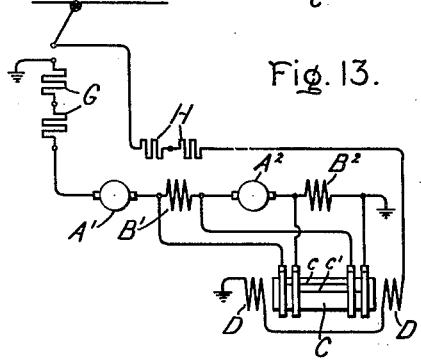
Figure 14:
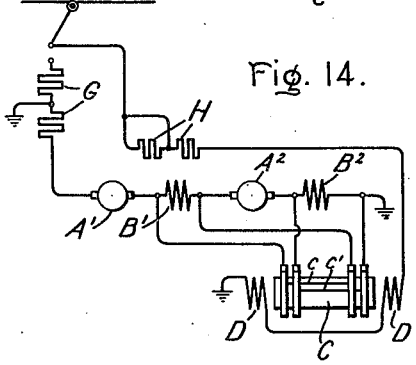
Figure 15:
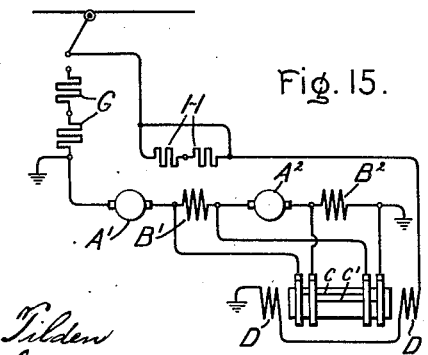

When the motors are in series, and the field-strength of the unipolar generator is a maximum, the counter-electromotive force of the motors cannot be further increased, so that when the speed of the motor falls to such an amount that the electro-motive force of the motors, with the connection of Fig. 4, is not greater than that of the line-voltage, the controller F must be moved to the other side of its off position, if continued braking is desired. When the controller is moved to the position indicated by the dotted line 13, the connections shown in Fig. 13 are established. The motors are disconnected from the line, and short-circuited through the resistance G, all of resistance H being included in the field of the unipolar generator. The motors consequently continue to act as generators, but the energy is used up in the resistance G, instead of being returned to the line. As the speed of the motors falls lower yet, the controller F may be moved to positions 14 and 15, in which resistance G is gradually cut out of the motor circuit, and resistance H is gradually cut out of the field of the unipolar generator, so as to give the maximum motor field-strength for low-speed braking.

I do not desire to limit myself to the particular construction and arrangement of parts here shown, but aim in the appended claims to cover all modifications which are within the scope of my invention.

What I claim as new and desire to secure by Letters Patent of the United States, is,—

1. The method of operating a plurality of series motors mechanically connected to drive a common load, which consists in connecting the motors to the line with each motor field in series with its armature, impressing independent voltages on the field terminals of the several motors, and simultaneously varying the amounts of said voltages.

2. The method of braking a plurality of series motors mechanically connected to drive a common load, which consists in impressing independent voltages on the field terminals of the several motors and gradually increasing said voltages simultaneously as the motor speed falls, while maintaining each motor field in series with its armature.

3. The method of braking a plurality of series motors mechanically connected to drive a common load, which consists in impressing independent voltages on the field terminals of the several motors and varying simultaneously the amounts of said voltages so as to cause the motors to act as generators to return energy to the line, and then disconnecting the motors from the line and short-circuiting them.

4. The method of braking a series motor which consists in connecting a source of voltage in shunt to the motor field and varying the amount of said voltage so as to cause the motor to act as a generator to return energy to the line and then disconnecting the motor from the line and short-circuiting the motor.

5. The method of operating a plurality of series motors mechanically connected to drive a common load, which consists in connecting the motors to the line first in series and then in parallel, maintaining each motor field always in series with its armature, impressing independent voltages on the field terminals of the several motors, and simultaneously varying the amounts of said voltages.

6. The method of braking a series motor which consists in short-circuiting the motor and impressing variable voltage on the motor field without disturbing the series connection of the motor.

7. In combination, a plurality of electric motors each having its field and armature connected in series, means for connecting said motors in series and in parallel with each other, a plurality of circuits in shunt to the respective motor fields each containing a source of voltage, and means for varying simultaneously the voltages in said circuits.

8. In combination, a plurality of electric motors each having its field and armature connected in series, a dynamo-electric machine having a plurality of armature circuits connected in shunt to the respective motor fields, and means for varying the armature voltage of said machine.

9. In combination, a plurality of electric motors each having its field and armature connected in series, a dynamo electric machine having a plurality of armature circuits connected in shunt to the respective motor fields, and means for varying the field-strength of said machine.

10. In combination, an electric motor having its field and armature connected in series, a circuit containing a source of variable voltage connected in shunt to the motor field, a source of current for the motor, and means for connecting the motor to the source of current and for short-circuiting the motor.

11. In combination, an electric motor having its field and armature connected in series, a dynamo-electric machine having its armature connected in shunt to the motor field, a source of current for the motor, means for connecting the motor to said source and for short-circuiting the motor, and means for varying the armature voltage of said machine.

12. In combination, a plurality of motors each having its field and armature connected in series, a source of voltage connected in shunt to the motor fields, a source of current for the motors, and a controlling switch arranged to connect the motors to said source in series and in parallel and to short-circuit the motors and to vary the amount of said voltage.

13. In combination, a plurality of motors each having its field and armature connected in series, a dynamo-electric machine having a plurality of armature circuits connected in shunt to the respective motor fields, and means for varying the armature voltage of said machine and for connecting the motors in series and in parallel with each other.

14. In combination, a plurality of electric motors each having its field and armature connected in series, a unipolar generator having a plurality of armature conductors and a plurality of sets of collector rings therefor, connections from different sets of collector rings to the several motor fields, and means for varying the armature voltage of said generator.

15. In combination, a plurality of electric motors each having its field and armature connected in series, a unipolar generator having a plurality of armature conductors and a plurality of sets of collector rings therefor, connections from different sets of collector rings to the several motor fields, and means for varying the field-strength of said generator.

16. In combination, a plurality of electric motors each having its field and armature connected in series, a unipolar generator having a plurality of armature conductors and a plurality of sets of collector rings therefor, connections from different sets of collector rings to the several motor fields, and means for connecting the motors in series and in parallel and for varying the armature voltage of said generator.

17. In combination, a plurality of electric motors each having its field and armature connected in series, a unipolar generator having a plurality of armature conductors and a plurality of sets of collector rings therefor, connections from different sets of collector rings to the several motor fields, and a controlling switch having its contacts arranged to connect the motors in series, then to weaken the field of said generator, then to strengthen the field of said generator, and to connect the motors in parallel, and then again to weaken the field-strength of said generator.

In witness whereof, I have hereunto set my hand this 7th day of September, 1907.

ERNST F. W. ALEXANDERSON.

Witnesses:
    BENJAMIN B. HULL,
    WM. W. PATTEN.